Jan. 23, 1940.　　　R. N. HICKMAN　　　2,188,044
EGG TRAY
Filed Aug. 13, 1936　　　2 Sheets-Sheet 1
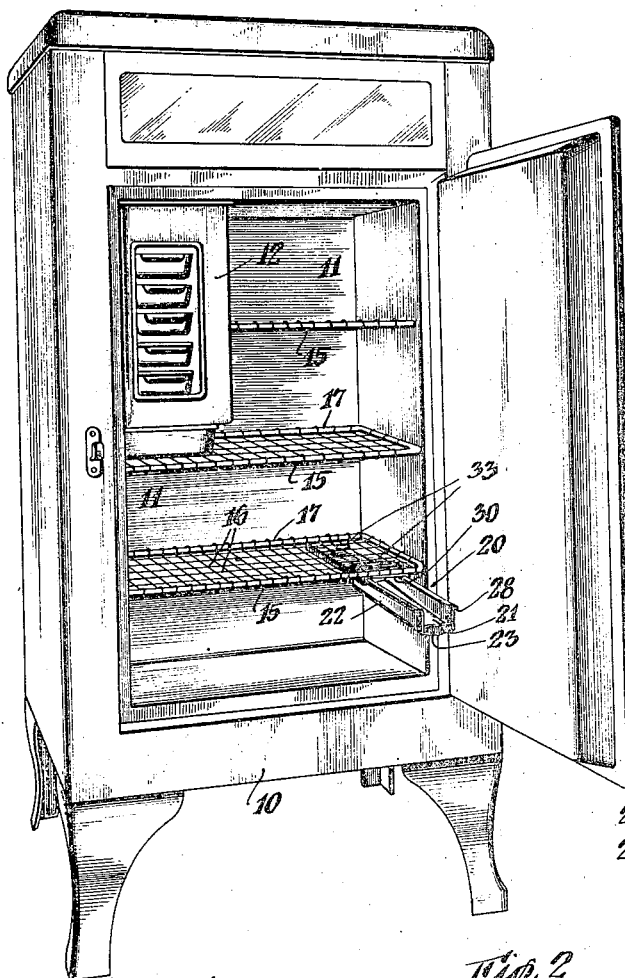
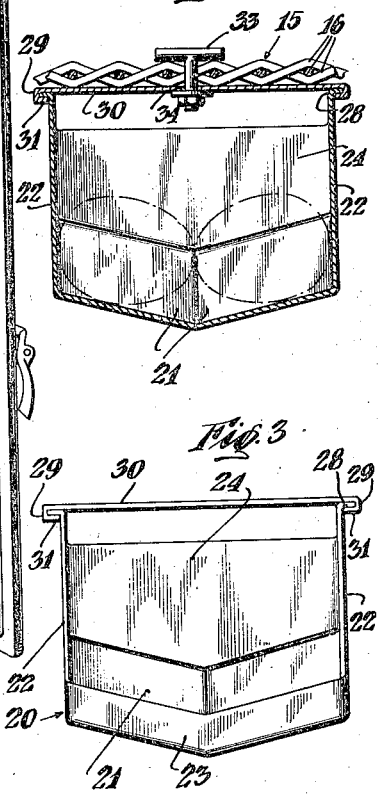
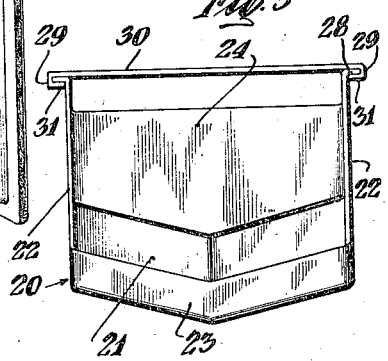
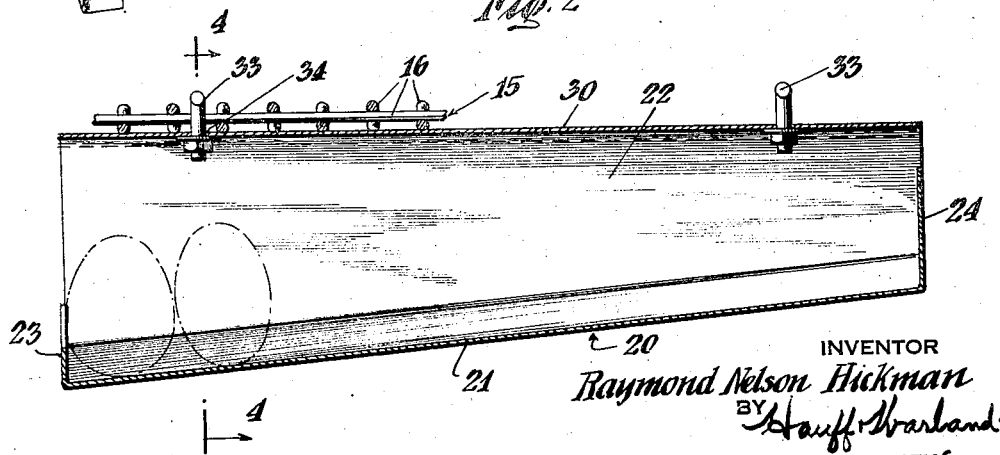
INVENTOR
Raymond Nelson Hickman
BY
ATTORNEYS.

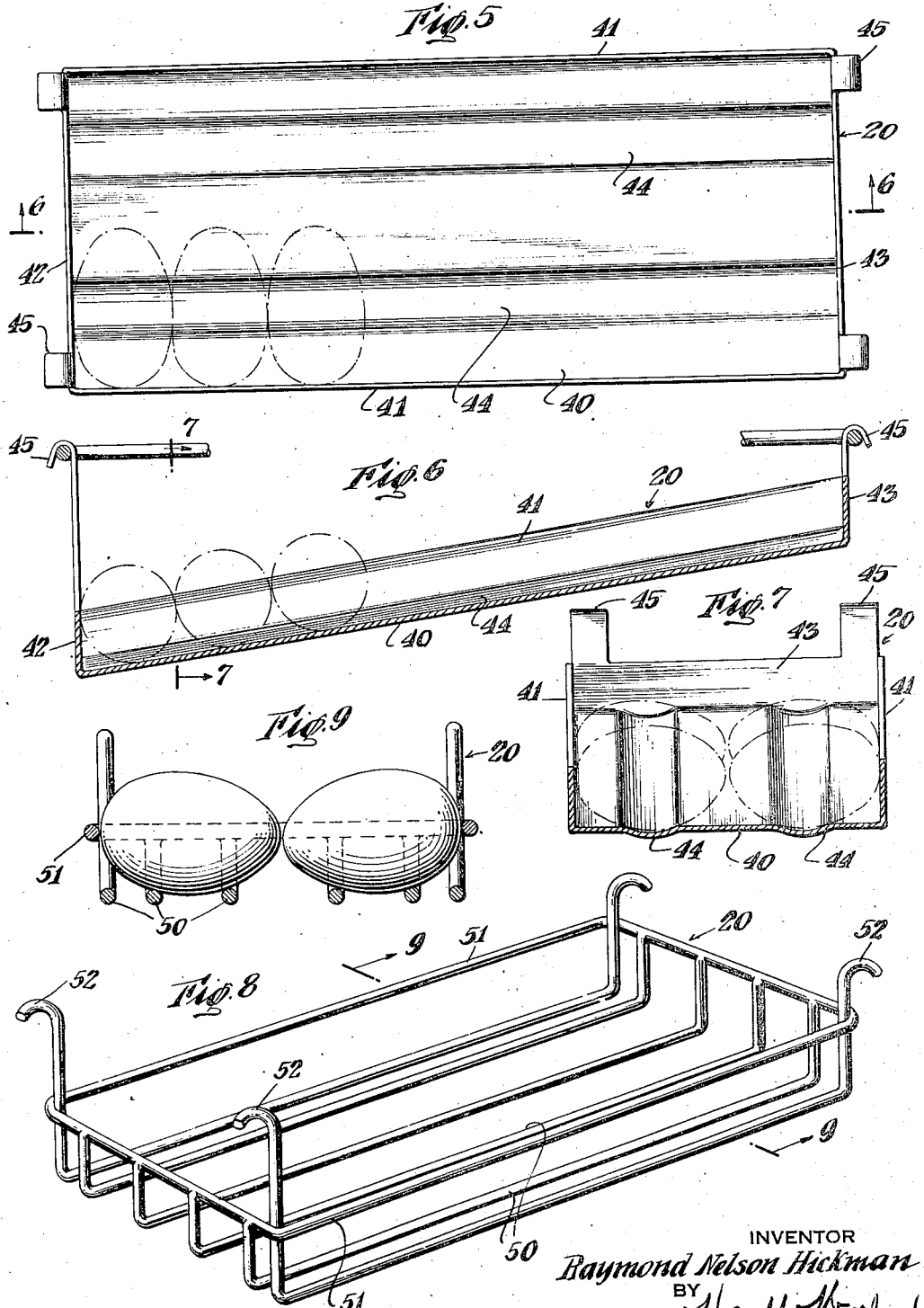

Patented Jan. 23, 1940

2,188,044

UNITED STATES PATENT OFFICE 2,188,044

EGG TRAY

Raymond Nelson Hickman, New York, N. Y.

Application August 13, 1936, Serial No. 95,779

4 Claims. (Cl. 211—143)

This invention relates to food dispensing trays for refrigerators or the like and more particularly to an egg tray which is adapted to conserve space within a refrigerator and to hold a supply of eggs in readily accessible position.

An object of the invention is to provide a cheap, simple, convenient and efficient device of the above type.

Various other objects and advantages will be apparent as the nature of the invention is more fully disclosed.

A feature of the invention consists in a sloping tray adapted to receive a supply of eggs and to be suspended from the bottom of a refrigerator shelf. The tray slopes toward the front in such a manner that, as an egg is removed therefrom, other eggs slide or roll down the sloping bottom to take its place, whereby one or more eggs are always available at the front of the tray. The tray may slide into a fixed channel mounted on the bottom of the refrigerator shelf or it may be hung from the shelf in any convenient manner. When so positioned, the tray utilizes space which would otherwise be wasted and at the same time holds the eggs in a particularly convenient position so that they may be reached without moving any of the other food in the refrigerator.

The invention also consists of various details of construction and combinations of parts hereinafter more fully set forth.

Although the novel features which are believed to be characteristic of this invention will be more particularly pointed out in the claims appended hereto, the invention itself, as to its objects and advantages and the manner of its operation, may be better understood by referring to the following description taken in connection with the accompanying drawings forming a part thereof, in which certain preferred embodiments of the invention are set forth for purposes of illustration.

In the drawings:

Fig. 1 is a perspective view of a refrigerator showing the location of the egg tray therein;

Fig. 2 is a longitudinal section through the egg tray;

Fig. 3 is a front elevation of the egg tray;

Fig. 4 is a section through the egg tray taken along the line 4—4 of Fig. 2;

Fig. 5 is a top plan view of a modified type of egg tray;

Fig. 6 is a longitudinal section taken along the line 6—6 of Fig. 5;

Fig. 7 is a transverse section taken along the line 7—7 of Fig. 6;

Fig. 8 is a perspective view of a further modified form of the invention; and

Fig. 9 is a transverse section taken along the line 9—9 of Fig. 8.

In the following description and in the claims certain specific terms are used for convenience in referring to various details of the invention. It is to be understood, however, that these terms are to be given as broad an interpretation as the state of the art will permit.

Referring to the drawings more in detail the invention is shown as applied to a refrigerator 10 of any standard construction having a food compartment 11 and a cooling unit 12. A plurality of shelves 15 are mounted in the food compartment 11 in the usual manner. The shelves 15 may be formed of crossed wires 16 held on a rigid wire frame 17. So far as the present invention is concerned, however, the shelves may be of any standard construction.

In accordance with the present invention, an egg tray 20 is mounted below one of the shelves 15, as for example at the bottom of the lower shelf. This egg tray 20 is shown more in detail in Figs. 2 to 4 as having a sloping bottom 21, side walls 22, a front flange 23 and a back flange 24. The sloping bottom 21 is also transversely inclined toward the center axis as indicated in Fig. 3 so as to facilitate the rolling or sliding of the eggs down the sloping surface to the front of the tray.

The side walls 22 are provided at their tops with horizontal flanges 28 which are adapted to slide longitudinally within channels 29 formed on a top 30. The channels 29 may be formed by bending the edges of the top 30 over to form horizontal flanges 31.

The top 30 is adapted to be permanently secured to the bottom of the shelf 15 as by T bolts 33 which extend through suitable apertures 34 in said top and are adapted to pass over a pair of adjacent wires 16 of said shelf. Said apertures 34 may be elongated so as to permit the bolts to be properly positioned with respect to said wires so that the device may be attached to various types of shelves.

With the top permanently secured in the manner above mentioned, the egg tray is readily removable therefrom by merely sliding the tray forwardly thereby causing the flanges 28 to slide longitudinally in the channels 29. The tray may thus be removed for cleaning or for filling.

The tray is preferably made in a shape corresponding to the standard shape of an egg container. Such containers are commonly made to hold two parallel rows of eggs with six eggs in each row. In order to fill the tray, the top is removed from such a container and the tray 20 is inverted thereover. The tray and container are then reversed in position thereby permitting the eggs to be deposited in the tray and the container to be removed therefrom. The eggs are thus deposited in two parallel rows along the sloping bottom 21 of the tray. The tray is then positioned in the refrigerator by sliding the same within the channels 29 of the top 30 in the manner above mentioned. Thereafter the sloping surface causes the eggs to accumulate near the front flange 23. The opening above the front flange is sufficient to permit the hand to be inserted therein for removing an egg. As soon as one egg is removed, the others slide or roll to the front of the tray, which may be shaken or vibrated, if necessary, to facilitate this movement.

In the modified form of the invention illustrated in Figs. 5 to 7, the tray is formed with a sloping bottom 40, side walls 41, front flange 42 and rear flange 43 in a manner substantially similar to the tray above described. The sloping bottom 40, however, is provided with one or more longitudinal grooves 44 which are spaced apart so as to cooperate with the rows of eggs and to form a track which facilitates the proper movement of the eggs within the tray.

In this embodiment, the tray may be provided with hooks 45 at the front and rear, respectively, which may be formed integrally with extensions of the front and rear flanges 42 and 43 and are adapted to be hooked over suitable wires 16 in the shelf 15. This type of tray is made without a top and is detachably hung from the shelves 15 of the refrigerator by means of the hooks 45, above mentioned. The operation is otherwise similar to that of the tray 10 shown in Figs. 1 to 4.

In the embodiment illustrated in Figs. 8 and 9, the tray is made by a plurality of longitudinal wires 50 which are bent upwardly at their ends and are joined to a wire frame 51. Certain of the wires 50 may be extended beyond the frame 51 so as to form hooks 52 adapted to hook over the wires 16 of a shelf 15.

This type of tray is light in weight and simple in construction. The longitudinal wires 50 form tracks down which the eggs roll or slide. It is to be noted that transverse wires are omitted in order to prevent interference with the longitudinal movement of the eggs in the tray. Such transverse wires, however, may be used, if necessary, for strengthening purposes provided they are placed out of the path of the eggs.

While certain preferred embodiments of the invention have been set forth in detail, it is obvious that the invention is not to be limited thereto, but that various changes and modifications may be made therein as will be apparent to a person skilled in the art. The invention is only to be limited in accordance with the following claims when interpreted in view of the prior art.

What I claim is:

1. In a refrigerator, in combination, a horizontal food shelf and an egg tray, the front of said egg tray being longer vertically than the rear part to provide a bottom sloping toward the front to cause the eggs to roll or slide therealong, said front having a bottom flange extending upwardly a sufficient height to prevent the eggs from rolling out and having an opening above said flange adapted to permit passage of a hand, a cover for said egg tray, means securing said cover to the bottom of said shelf and means slidably mounting said tray on said cover whereby said tray may be slidably removed from said cover without removing the cover from said shelf.

2. In a refrigerator, in combination, a horizontal food shelf and an egg tray, the front of said egg tray being longer vertically than the rear part thereof to provide a bottom sloping toward the front to cause the eggs to roll or slide therealong, said tray having upstanding side members extending from the sloping bottom to the horizontal shelf, said front having a bottom flange extending upwardly to a sufficient height to prevent the eggs from rolling out and having an opening above said flange adapted to permit the passage of a hand, said tray having longitudinal flanges formed at the top of said side members, a cover having channels in which said flanges are adapted to slide and means permanently securing said cover to the bottom of said shelf, whereby said egg tray may be slidably removed from said cover for purposes of cleaning or filling the same.

3. A food tray adapted to be suspended below a horizontal shelf, having a bottom, upstanding side walls and front and back flanges extending upwardly from said bottom to a sufficient height to prevent articles from rolling out, the front having an opening above said front flange to permit passage of the hand, said side walls being horizontal at their upper edges and being inclined at their lower edges to provide a bottom sloping toward the front, longitudinal flanges formed at the top of said side walls, a cover having channels adapted to slidably receive said last flanges whereby said tray may be slidably removed therefrom, and means permanently securing said cover to the bottom of a shelf.

4. In a refrigerator, in combination, a horizontal food shelf and an egg tray, the front of said egg tray being longer vertically than the rear part to provide a bottom sloping toward the front to cause the eggs to roll or slide therealong, said front having a bottom flange extending upwardly a sufficient height to prevent the eggs from rolling out, a member having means slidably engaging said tray and means securing said member to the bottom of said shelf whereby said tray may be slidably removed from said member without removing the member from said shelf.

RAYMOND NELSON HICKMAN.